UNITED STATES PATENT OFFICE 2,044,036

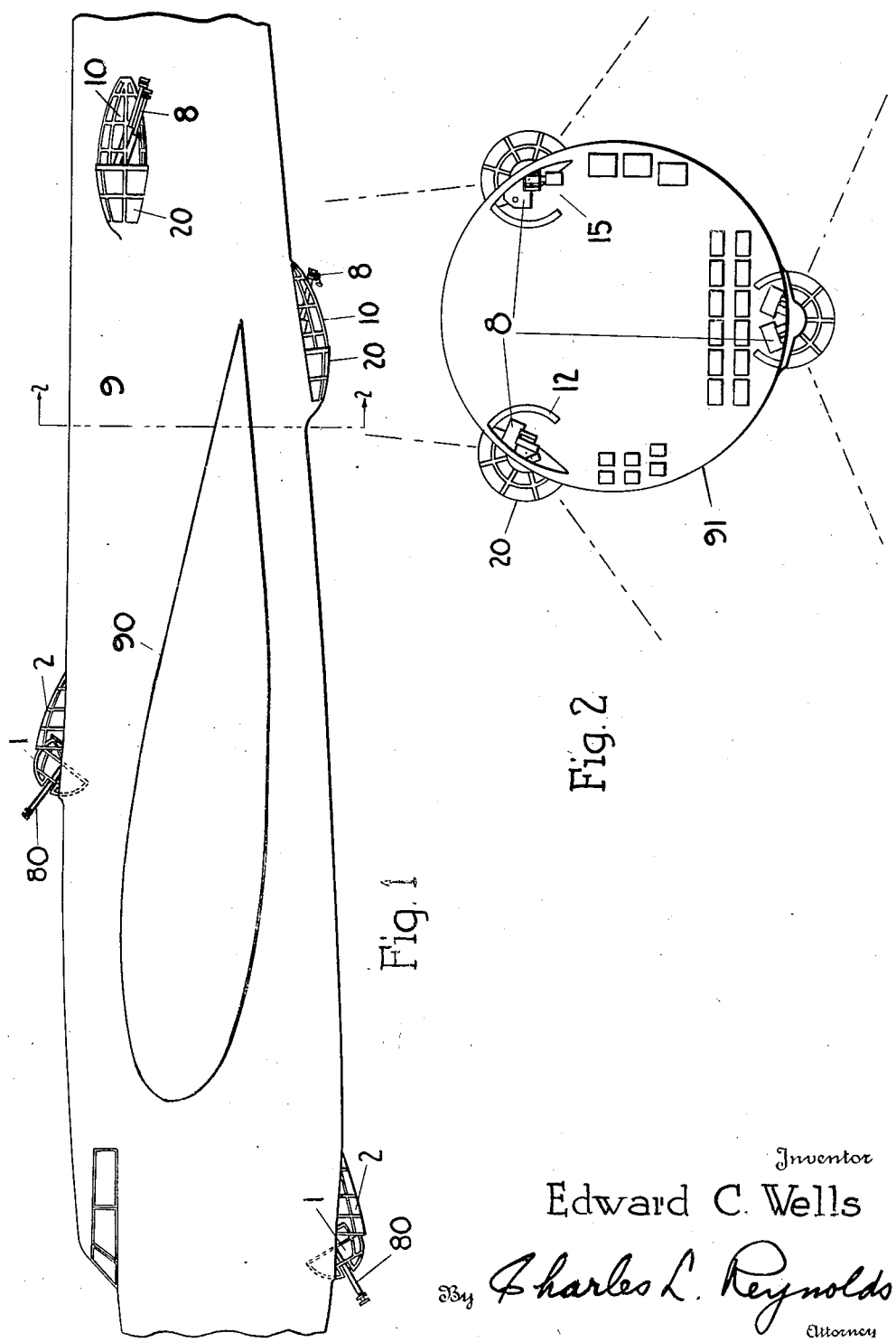

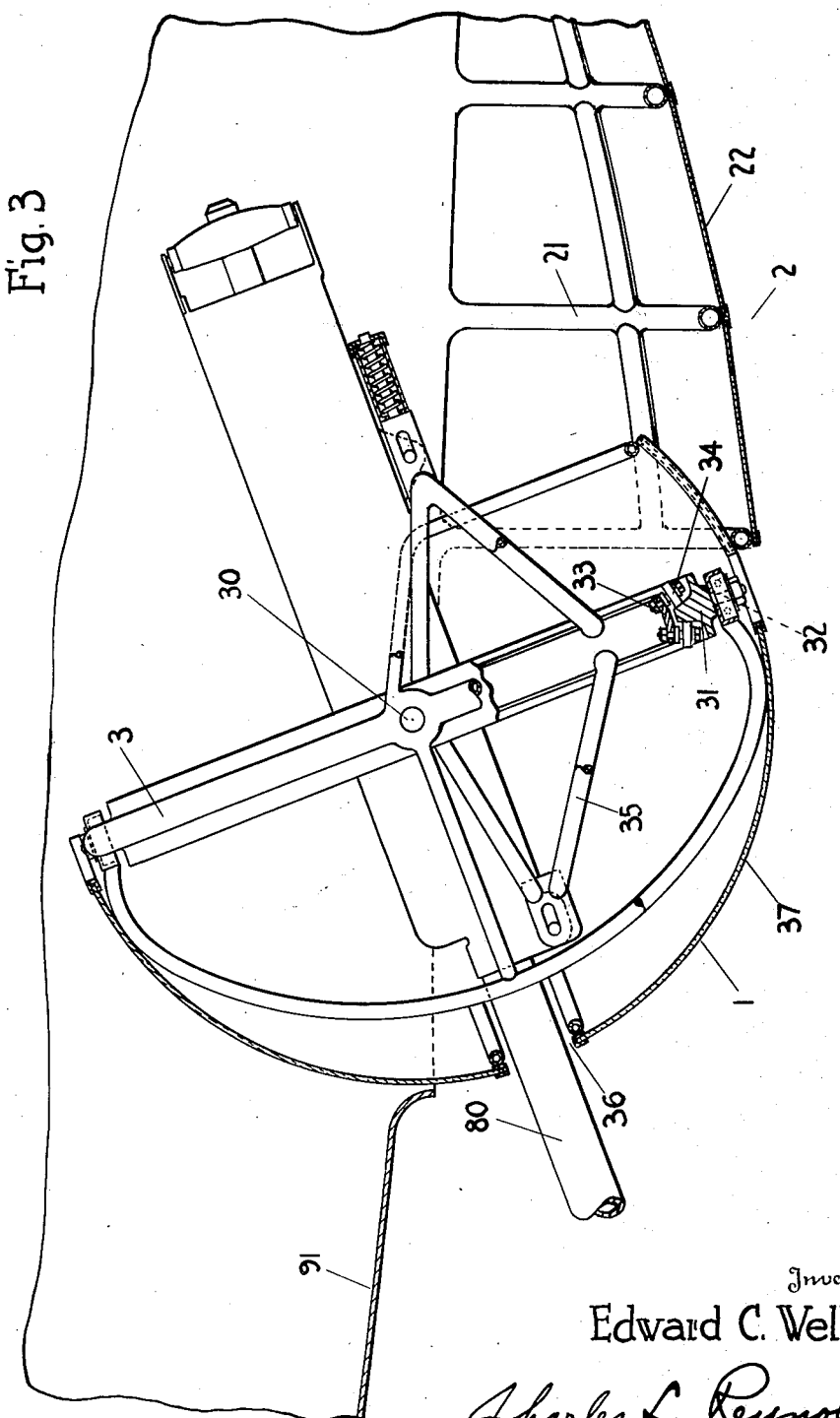

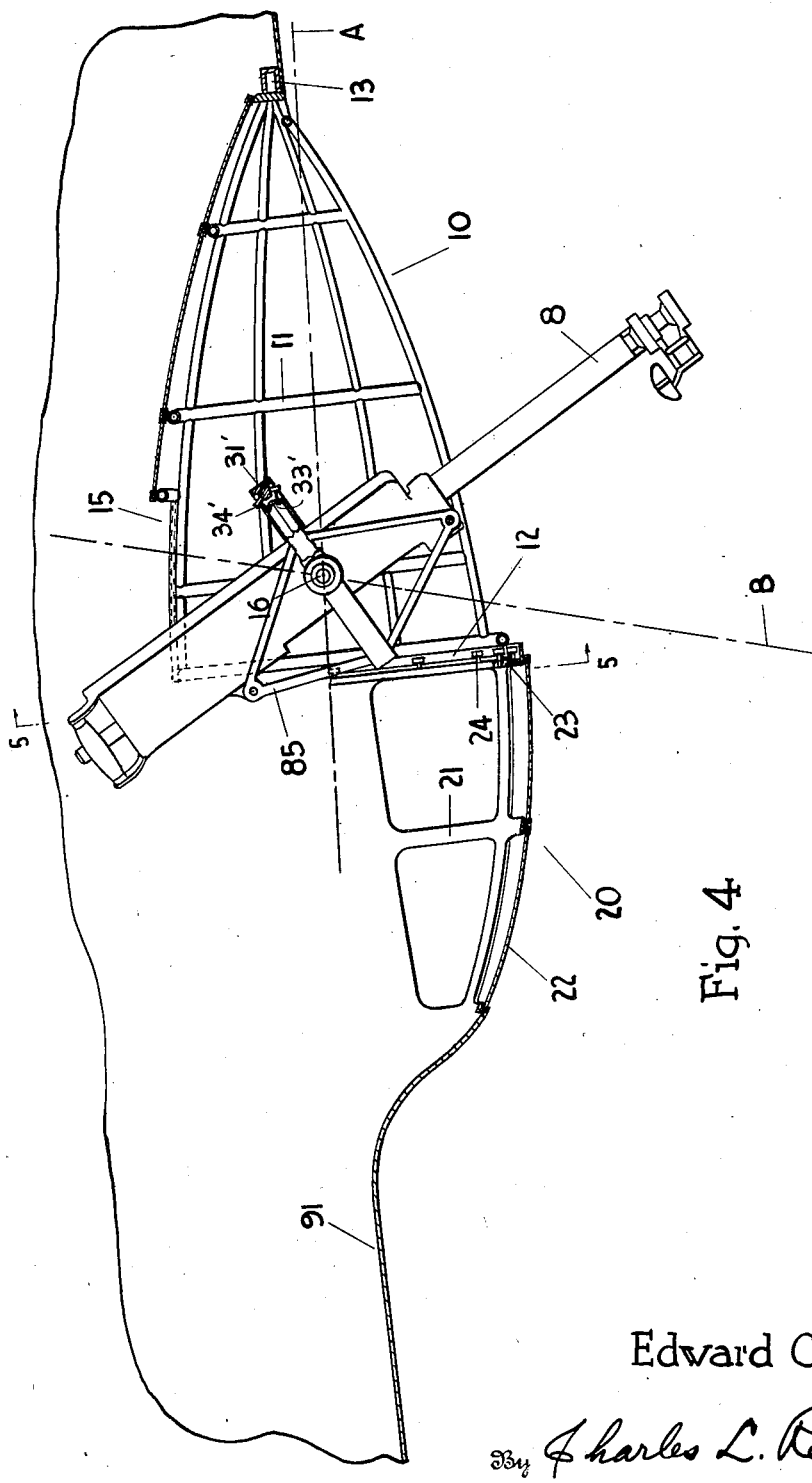

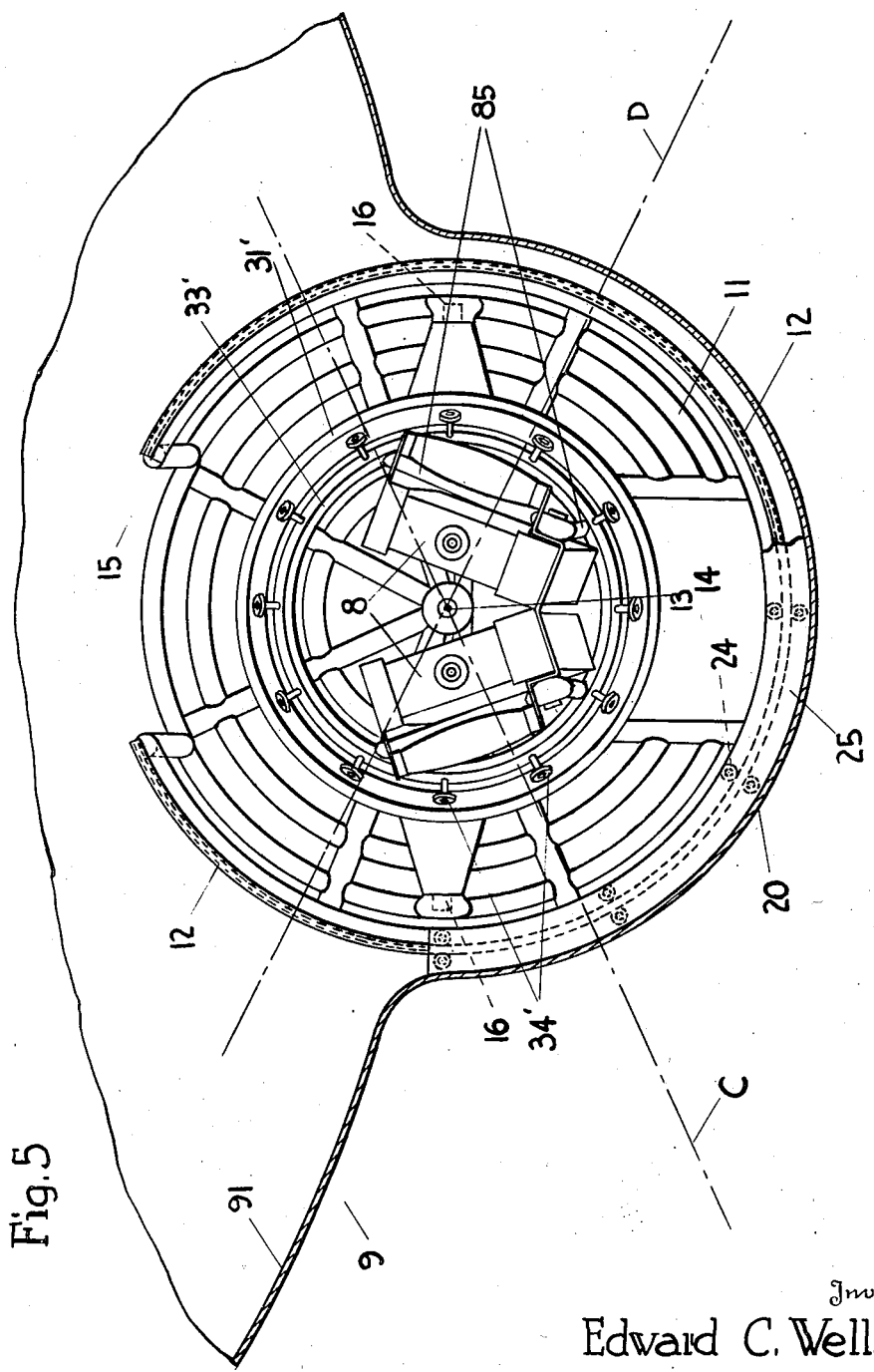

GUN MOUNT

Edward C. Wells, Seattle, Wash., assignor to Boeing Aircraft Company, Seattle, Wash., a corporation of Washington Application December 18, 1934, Serial No. 758,055

12 Claims. (Cl. 89—37)

My invention relates to movable gun mounts for use upon aircraft structure, such as a bombing airplane, and is an improvement upon the gun mount disclosed and claimed in an application of John C. Sanders, Serial No. 749,040, filed October 17, 1934, having the same general objects in view.

One of the particular objects of the present invention is to mount guns upon a streamlined aircraft structure, for example the fuselage, and projecting laterally into the air stream to fire forwardly or to the rear, in such a way that room is afforded for the head of a gunner in a free space, either ahead of or behind the gun, depending upon whether it points rearward or forward, the gun and such space being all enclosed within a streamlined enclosure faired into the surface of the aircraft structure so that the minimum of drag is produced thereby.

It is a further object to provide a mounting for airplane guns, having the advantages given above, by means of which the guns may have free movement with respect to the airplane structure within approximately a quarter sphere.

It is a further object to devise a mounting such as is indicated, in which the weight of the parts may be lessened, and the entire arrangement made more convenient for the handling, loading and general operation of the guns, and specifically one in which the rotative parts of the gun mount form a part only of the mount, and in which there is provided a fixed part faired into the skin of the aircraft structure, which complements the rotative or movable part to complete the streamlined enclosure.

With the above and other objects in mind, as will appear hereafter, my invention comprises the novel parts and the novel combination and arrangement thereof, as shown in the accompanying drawings, described in this specification, and as will be more particularly defined by the claims which terminate the same.

In the accompanying drawings I have shown my invention embodied in two forms of construction, one for a forward gun and one for a rear gun, as now preferred by me.

Figure 1 is an elevation of a portion of the fuselage of an airplane, showing each type of gun mount.

Figure 2 is a transverse section, shown more or less diagrammatically, on the line 2—2 of Figure 1, and illustrating the relative arrangement of the guns and their fields of fire.

Figure 3 is a longitudinal section through the skin of the aircraft structure, illustrating a forwardly pointing gun and its mount.

Figure 4 is a longitudinal section through the skin of an aircraft structure, illustrating a rearwardly pointing gun and its mount.

Figure 5 is a transverse section through such a mount, taken substantially on the line 5—5 of Figure 4.

The fuselage 9, shown in Figures 1 and 2, is supported in flight by wings 90, shown in outline in Figure 1, and for protection against pursuit ships or for neutralizing anti-aircraft installations is provided with a number of movable guns. Primarily such a plane must defend itself against pursuit planes approaching from the rear, and a plurality of guns 8 has been shown, spaced about the skin of the fuselage at angles of about 120°, so that if three such guns are used they have overlapping spheres of fire, and each such gun projecting from the airplane is so mounted that it will have approximately a quarter sphere of fire, or something in excess of a quarter sphere, from at least a plane normal to the longitudinal axis of the airplane passing through the gun mount, rearwardly, the various spheres or fields of fire of any two guns intersecting, in the particular arrangement shown, at a distance of 100 feet from the fuselage.

Since, however, pursuit tactics would be to approach from ahead of the bombing plane, if all guns were directed rearwardly, it is also necessary to provide forwardly pointing guns, such as the guns 80, and of these I have shown one mounted upon and projecting from the top of the fuselage 9, and another similarly mounted at the bottom of the fuselage.

The skin 91 of the fuselage is apertured for the projection of these guns, and in the case of the forward gun, shown in Figure 3, the aperture is extended somewhat rearwardly behind the gun. This aperture is then enclosed by a two-part enclosure consisting of a fixed shell 2 at the rear and a movable shell 1 forward of the fixed shell. In the forward gun mount the movable shell 1 is bulbous in shape, for example being part-spherical, and the fixed rear shell would preferably be built as an integral part of the fuselage 9, but extends in line with the forward shell, elongated to the rear and tapered, to form in effect, and in conjunction with the forward shell, a streamlined enclosure which protrudes from the skin of the fuselage and is faired into this skin at all points.

The forward or movable part 1 of the enclosure may be similar to any suitable one of the structures disclosed in the Sanders application, referred to above, and therefore requires but little detailed description. For example, it consists of a part-spherical framework 3 supported on transversely extending trunnions 30 to swing upon a transverse axis, a track 31 carried upon trunnions or bearings 32 disposed at right angles to the axis of the trunnions 30, so that the annular track 31 may swing transversely upon these bearings 32, and a ring 33 carried upon rollers 34 engaging the track 31, so that a framework 35 carried by the ring 33, and which supports the gun 80, may rotate about the axis of the gun barrel. The framework 3 is formed with a slot 36 to accommodate swinging movement of the gun about the axis of the bearing 32, and the shell may be completed or covered with transparent material, as indicated at 37, this material being preferably plastacelle. The fixed enclosure 2 is formed of a skeleton framework 21 defining window openings which are closed with plastacelle panels 22.

In the rear gun mount the forward shell of the enclosure is the fixed shell, and is designated 20, and the rear shell 10 is movable. While a similar universal mounting to that described for the forward gun, modified in shape, might be employed, it is preferred that the movable shell 10 be formed of a framework 11 terminating at its forward end in a part circular track 12, and at its rear end in a trunnion or bearing 13, disposed in the axis of the circular track 12. The fixed part of the shell, as before, is formed of framework 21 which may be integral with the structural parts of the fuselage (not shown), and at its rear end this fixed portion terminates in a ring 23 supporting rollers 24 which are disposed at opposite sides of the track 12, and thus this track is supported in what is in effect a rotatable or pivotal mount, so that the movable shell 10 may rotate as a whole about a longitudinal axis.

The movable shell 10 is provided with a slot 14 extending lengthwise through which the gun 8 projects, and its forward end must be cut away or slotted as indicated at 15 for the swinging of the inner end of the gun, in order to permit the maximum forward angle of swing. The gun 8 might be merely mounted directly upon the shell 10, to swing upon a generally transverse axis, lengthwise of the slot 14. For greater freedom of movement, however, and so that the gun may be right side up when firing to the side or somewhat forwardly, I prefer that the gun be mounted in a framework 85, fixed to a ring 33', and rotatable with respect to a track 31' by means of rollers 34', the track being swingable about trunnions 16 supported in the shell 10, and defining a generally transverse axis. By movement of the gun on the trunnions 16 the gun may be moved through an angle, illustrated by the lines A and B of Figure 4, and by rotating the rear shell 10 about the axis of the ring 12 and bearing 13 the gun may be given a movement through an angle represented by the lines C and D of Figure 5. By rotating the gun and ring 33' relatively to the track 31' the gun may always be kept right side up. As may be seen in Figure 2, three such guns, mounted 120° apart around the substantially circular fuselage, will each cover about a quarter sphere of fire, and these fields of fire will overlap, permitting two such guns to be brought to bear upon any object within range and not closer than 100 feet from the fuselage, in the present design.

It will be observed that in some instances two guns are mounted in each mount, and in some instances a single gun only. This is a matter of choice. It may be desired to mount a .50 caliber gun and a .30 caliber gun, each in the same mount, so that one or the other may be used as the occasion may require, or it may be preferable to mount two guns of like caliber in a single mount, so that both may be used together, or one only may be used and the other brought into use if the first one jams.

While the ammunition supply arrangements are suggested in Figure 2, I have not shown ammunition boxes mounted in conjunction with the guns in order to avoid obscuring other parts of the mount, nor have I shown receptacles for collecting the discharged shells and the links. Details of such arrangements may be the same or similar to the arrangements disclosed in the Sanders application referred to above.

By making the rotating parts of such a side mount a part only of the entire mount or enclosure, the amount of weight required is lessened, for it is more difficult and requires more metal to brace a large cage subject to the stresses of firing a machine gun, and furthermore the part of the enclosure into which the gunner may have to insert his head may thus be left free of all internal bracing or other obstruction, to the end that the gunner may better control his gun and have freedom of movement and sight.

What I claim as my invention is:

1. In combination with that portion of the body surface of an aircraft structure which is disposed substantially lengthwise with relation to the direction of flight, a gun mount, an enclosure therefor outstanding laterally from such surface as a fair protuberance having a substantially tear-shaped segmental, longitudinal profile, having its point directed rearwardly, and including a forward shell and a rear shell complemental to each other, one of said shells being fixed with relation to the aircraft structure, and means guiding the other shell for movement with respect to the fixed shell about an axis disposed substantially in such aircraft surface.

2. In combination with an aircraft structure, and with a gun projecting therefrom, a streamlined enclosure protruding laterally from the surface of the aircraft structure and surrounding the inner end of the gun, and comprising complemental forward and rear shells, one shell being movable about an axis lying substantially in the surface of the aircraft structure and supporting the gun, and the complemental shell being fixed with relation to the aircraft structure.

3. In combination with a streamlined aircraft structure, and with a gun projecting therefrom, a two part streamlined enclosure surrounding the inner end of the gun, both parts of which protrude laterally from and are faired into the streamlined surface of the aircraft structure, and comprising a forward shell and a rear shell, one of said shells being movable with respect to the other about an axis lying substantially in the surface of the aircraft structure parallel to its longitudinal axis and supporting the gun for aiming movements.

4. In combination with a streamlined aircraft structure, and with a gun projecting therefrom, a two-part streamlined enclosure surrounding the inner end of the gun, both parts of which protrude laterally from and are faired into the streamlined surface of the aircraft structure, and comprising forward and rear complemental shells, one of said shells being swingable with respect to the other about an axis lying substantialy in the surface of the aircraft structure normal to its longitudinal axis, to dispose the surface of said swingable shell, in all positions, in the same faired relationship to the aircraft structure, said swingable shell supporting the gun for aiming movements.

5. In combination with that portion of the body surface of an aircraft structure which is disposed substantially lengthwise with relation to the direction of flight, a gun mount, an enclosure therefor outstanding laterally from the aircraft surface as a fair protuberance having a substantially tear-shaped segmental, longitudinal profile, having its point directed rearwardly, and including a forward shell and a rear shell complemental to each other, one of said shells being structurally integral with the aircraft structure, means guiding the other shell for movement with respect to said integral shell about an axis substantially in the aircraft surface, and means supporting the gun mount from said movable shell.

6. In combination with that portion of the body surface of an aircraft structure which is disposed substantially lengthwise with relation to the direction of flight, a gun mount, a two-part streamlined enclosure therefor both parts of which protrude laterally from the aircraft surface, one part thereof being fixed with relation to the aircraft structure, means guiding the complemental part for movement about an axis lying substantially in such surface, and means supporting said gun mount from said movable part for swinging thereof about an axis disposed at an angle to the axis about which said movable part moves.

7. In combination with a streamlined airplane fuselage, a stationary protuberance thereon terminating rearwardly in a plane substantially normal to the longitudinal axis of the fuselage, a movable enclosure complemental to said stationary protuberance, disposed immediately behind and faired into said protuberance, a gun mount housed within and supported from said movable enclosure to support a gun projecting laterally therefrom, means guiding said enclosure to swing about an axis parallel to the longitudinal axis of the fuselage, and means supporting said gun mount to swing with respect to said movable enclosure about an axis transverse to the longitudinal axis of the fuselage through an angle in excess of 90° to enable a gun supported in said mount to fire through any part of a field of fire extending from directly rearward to forward of a plane normal to the longitudinal axis of the fuselage passing through said gun mount.

8. The combination of claim 7, the means guiding the enclosure to swing about a longitudinal axis comprising a circular track upon the forward edge of the enclosure, a plurality of rollers on the rear edge of the forward protuberance engaging opposite sides of said track, and an axially disposed bearing mounted on the fuselage and supporting the rear end of the enclosure.

9. In combination, an airplane fuselage, three stationary protuberances on the sides thereof spaced at angles of approximately 120° about its longitudinal axis, each terminating rearwardly in a plane substantially normal to such axis, three movable enclosures, complemental to said stationary protuberances, disposed one immediately to the rear of and faired into each protuberance, a gun mount housed within and supported from each movable enclosure to support a gun projecting laterally therefrom, and means guiding each of said movable enclosures to swing about an axis parallel to the longitudinal axis of the fuselage through an angle in excess of 120°, to enable the fields of fire of adjacent guns to overlap in a direction substantially normal to the longitudinal axis of the fuselage.

10. The combination of claim 9, and means supporting each gun mount to swing about an axis transverse to the longitudinal axis of the fuselage through an angle in excess of 90°, to enable each gun to fire through a field extending from directly rearward to forward of a plane normal to the longitudinal axis of the fuselage passing through the gun mount.

11. In combination with a surface of a streamlined aircraft structure disposed substantially parallel to the direction of flight, a gun mount, an enclosure therefor rotatable to a limited degree about an axis disposed generally in the aircraft surface, means guiding said gun mount for swinging about an axis substantialy normal to said first axis, to enable a gun received in said mount to fire rearwardly substantially along said surface, and a protuberance fixed with respect to the aircraft structure, disposed immediately ahead of and faired into said enclosure, and freely communicating therewith in all rotative positions thereof, to receive the gunner's head and the gun's breech when it is firing rearwardly substantially along the aircraft surface.

12. In combination with the surface of a streamlined aircraft structure disposed substantially parallel to the direction of flight, a spherical enclosure partly within and partly protruding from such surface, and rotatable about a diameter disposed substantially in such surface, but transversely of the direction of flight, a complemental protuberance from such surface fixed in position immediately to the rear of the spherical enclosure, fairing the latter into the aircraft surface, and a gun projecting outwardly and inwardly from, and mounted in the spherical enclosure, the fixed protuberance being freely open at its forward end for the reception of the gunner's head and the inner end of the gun when firing forwardly along the aircraft surface.

EDWARD C. WELLS.